(12) United States Patent
Marsan et al.

(10) Patent No.: US 8,509,772 B2
(45) Date of Patent: *Aug. 13, 2013

(54) METHOD FOR RE-ENTRY INTO A COMMUNICATION NETWORK AFTER RADIO FREQUENCY OUTAGE

(75) Inventors: Mark J. Marsan, Elmhurst, IL (US); Ravi M. Adatrao, West Dundee, IL (US); Pramod Karnam, Rolling Meadows, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,133

(22) Filed: Jul. 12, 2012

(65) Prior Publication Data
US 2012/0276939 A1 Nov. 1, 2012

Related U.S. Application Data

(63) Continuation of application No. 12/534,213, filed on Aug. 3, 2009, now Pat. No. 8,229,428.

(60) Provisional application No. 61/092,607, filed on Aug. 28, 2008.

(51) Int. Cl.
*H04W 4/00* (2009.01)
(52) U.S. Cl.
USPC ......... 455/435.1; 455/436; 455/439; 455/445
(58) Field of Classification Search
USPC .............. 455/435.1, 436, 439, 445; 370/331, 370/329, 337
See application file for complete search history.

(56) References Cited

U.S. PATENT DOCUMENTS

| | | | |
|---|---|---|---|
| 2005/0277417 A1* | 12/2005 | Yoon et al. | 455/436 |
| 2006/0058056 A1 | 3/2006 | Das et al. | |
| 2006/0229075 A1 | 10/2006 | Kim et al. | |
| 2009/0279502 A1* | 11/2009 | Zheng et al. | 370/331 |
| 2010/0189077 A1 | 7/2010 | Kim et al. | |

FOREIGN PATENT DOCUMENTS

WO 2006062475 A2 6/2006

OTHER PUBLICATIONS

IEEE Std 802.16-2004, "6.3.2.3.6 Ranging Response (RNG-RSP) Message" IEEE Standard for Metropolitan Area Networks, Part 16: Air interface for Fixed Broadband Wireless Access Systems, 2004, Cover page and pp. 50-51.

(Continued)

*Primary Examiner* — Manpreet Matharu

(57) ABSTRACT

A method and apparatus for that provides a re-entry procedure following a radio frequency outage in a wireless communication network is disclosed. The method includes providing (204) a entity identification for a base station (102-106) or a paging controller (108) to a mobile station (110) during initial entry of the mobile station to a wireless communication network. The method also includes storing (206) mobile station context information at an entity corresponding to the entity identification. After a radio frequency outage occurs after the initial entry of the mobile station into the network, a notification is sent (218) that indicates that the mobile station is re-entering the wireless communication network. Based on the notification that there has been a radio frequency outage, the mobile station context information is obtained (220) to assist the mobile station to re-enter the wireless communication network.

19 Claims, 3 Drawing Sheets

(56) References Cited

OTHER PUBLICATIONS

IEEE Std 802.16-2005, "6.3.9.15 Forcing MSs to Perform Network Entry at Once" IEEE Standard for Metropolitan Area Networks, Part 16: Air interface for Fixed Broadband Wireless Access Systems, 2005, Cover page and p. 195.

IEEE Std 802.16-2005, "11.5 RNG-REQ Message Encodings" IEEE Standard for Metropolitan Area Networks, Part 16: Air interface for Fixed Broadband Wireless Access Systems, 2005, Cover page and pp. 678-679.

IEEE Std 802.16-2005, "6.3.2.3.5 Ranging Request (RNG-REQ) Message" IEEE Standard for Metropolitan Area Networks, Part 16: Air interface for Fixed Broadband Wireless Access Systems, 2005, pp. 50-52.

IEEE Std 802.16-2005, "11.6 RNG-RSP Management Message Encodings," IEEE Standard for Metropolitan Area Networks, Part 16: Air interface for Fixed Broadband Wireless Access Systems, 2005, Cover page and pp. 679-684.

* cited by examiner

METHOD FOR RE-ENTRY INTO A COMMUNICATION NETWORK AFTER RADIO FREQUENCY OUTAGE

RELATED APPLICATIONS

The present application is a continuation of U.S. patent application Ser. No. 12/534,213 currently pending and filed on Aug. 3, 2009.

FIELD OF THE INVENTION

The present invention relates generally to entry procedures for a mobile station into a communication network and, in particular, entry procedures for a mobile station to re-enter a communication network after a radio frequency outage.

BACKGROUND

A mobile station uses a given procedure when it enters a wireless communication network such as Code Division Multiple Access networks, Global System of Mobile Communication networks, $3^{rd}$ Generation networks, 802.16x networks, etc. A mobile station can enter a network under a number of different scenarios such as initial entry, idle mode re-entry and handover re-entry. The procedures for each of these entries or re-entries take into consideration the circumstances that the mobile station is under when it is establishing or re-establishing communications with a base station operating within the wireless communication network. For initial entry, the mobile station provides data and information about the mobile station, e.g. MAC address, MAC version, etc., that the base station uses to enter the mobile station with the network and to establish a link between the base station and the mobile station. This initial network entry procedure can be time consuming and can take tens of seconds.

Before an idle mode re-entry can be performed, the base station and mobile station agree that the mobile station will enter idle mode. As such, the base station stores mobile station context information to be used when the mobile station performs the idle mode re-entry procedure. In addition, the mobile station context information can be stored by a paging controller entity within the wireless communication network. During idle mode re-entry the base station can obtain the mobile station context information from the paging controller to be used as a part of the re-entry procedure. The use of the mobile station context information can expedite the re-entry procedure over the time involved for the initial entry procedure.

A handover re-entry procedure operates similarly to the idle mode re-entry procedure. In handover re-entry procedure the base station and mobile station are aware that the handover will occur from one base station to another base station. Mobile station context information can therefore be appropriately stored at a base station or paging controller entity and used as a part of the handover re-entry procedure. As a part of storing the mobile station context information, the base station and mobile station can be informed where the information is being stored as a part of idle mode re-entry and handover mode re-entry.

A mobile station needs to enter or re-enter a wireless communication network after a radio frequency outage. Radio frequency outages most often occur unexpectedly therefore not permitting the mobile station or the base station to prepare for a network re-entry procedure that is similar to the idle mode network re-entry procedure or handover network re-entry procedure. Thus, the mobile station and base station are forced to use the initial network entry procedure, which takes longer to complete then the network re-entry procedures. What is therefore needed is a network re-entry procedure for a mobile station and base station to use after a radio frequency outage is detected.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
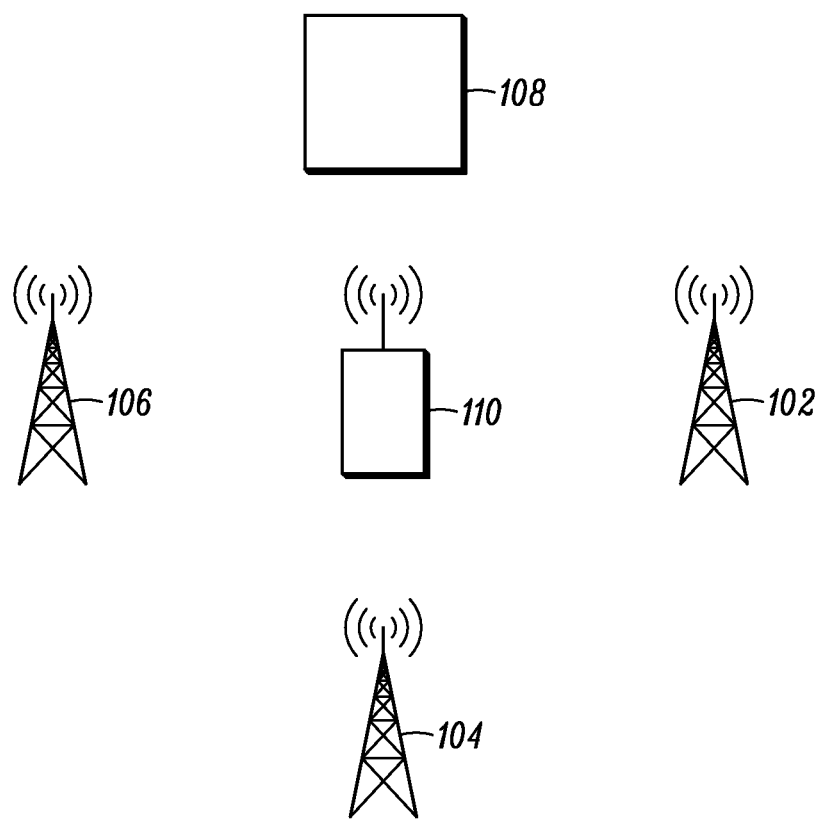
FIG. 1 is an example of a wireless communication network that utilizes an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method of re-entry into a communication network after a radio frequency outage. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the method of re-entry into a communication network after a radio frequency outage described herein. The non-processor circuits may include, but are not limited to, a radio receiver, a radio transmitter, signal drivers, clock circuits, power source circuits, and user input devices. As such, these functions may be interpreted as steps of a method to perform the method of network re-entry after a radio frequency outage. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is direct to a method that provides a re-entry procedure following a radio frequency outage in a wireless communication network. In an embodiment, the method includes providing one or more entity identifications to a mobile station during initial entry of the mobile station to a wireless communication network. The entity identification can be for a base station to which the mobile station is connecting or a paging controller entity of the network. The base station or paging controller entity may represent the location that MS context is stored in the future if the base station detects an RF outage. The method also includes storing mobile station context information at an entity such as the serving base station or the paging controller corresponding to the entity identification. After a radio frequency outage occurs after the initial entry of the mobile station into the network, a notification is received by a base station that indicates that the mobile station is re-entering the wireless communication network. Based on the notification that there has been a radio frequency outage, the mobile station context information is obtained to assist the mobile station to re-enter the wireless communication network. In an embodiment, the notification includes a message, which can be a range request message, indicating the mobile station experienced a radio frequency outage. If the mobile context information cannot be obtained after receiving the notification, the mobile station will perform initial network entry procedures.

The present invention is also directed to a method where a mobile station receives one or more entity identifications for an entity that operates within a wireless communication network. The entity can be the serving base station for the mobile station or the paging controller for the network. The entity identification corresponds to the serving base station or paging controller where mobile station context information, which can be used during network re-entry procedures, can be stored. During operations of the mobile station within the network, the mobile station detects a radio frequency outage with the wireless communication network. After the radio frequency outage, the mobile station performs a re-entry procedure with the wireless communication network wherein the re-entry procedure includes sending a message to the wireless communication network indicating the radio frequency outage and the entity identifications. In an embodiment, the message includes a mobile station identification. The mobile station may not know where the mobile station context information is stored, e.g. the serving base station or the paging controller. The serving base station designates the storage location for the mobile station context information and can provide both entity identifications to the mobile station.

Turning to FIG. 1, a wireless communication network 100 is shown in which the principles of the present invention can be performed. The wireless communication network includes a number of base stations 102-106 and a paging controller 108. The wireless communication network 100 can include other network entities, such as base station controllers, Access Service Network (ASN) etc. (not shown) that are used to operate a wireless communication network according to know processes and procedures including those set by 802.16x and in particular 802.16e standards. The network entities including the base stations 102-106 and paging controller 108 operate according to these various processes and procedures so that mobile stations 110-114 can communication with one another or with other communication devices. The base stations 102-106, paging controller 108 and mobile stations 110-114 are each configured with the necessary processors, memories and other components necessary to operate in the processes described.

Figure 2:
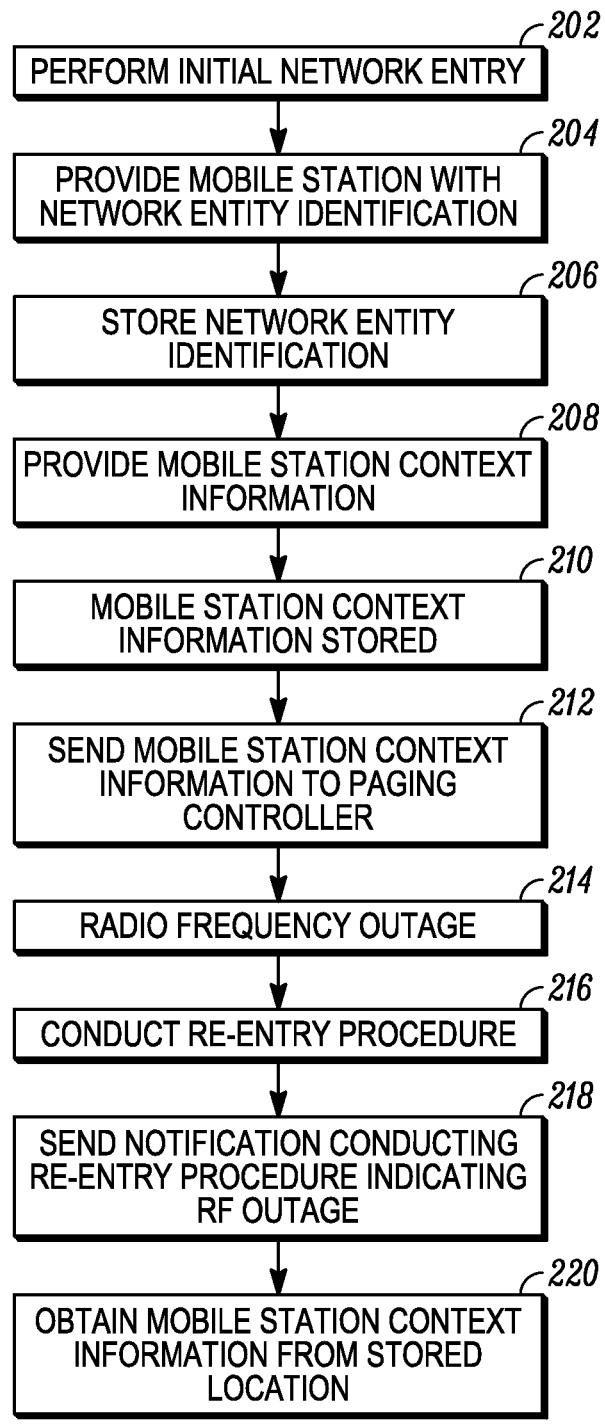
FIG. 2 is a flow chart of the operation of a base station utilizing the network re-entry procedures in an embodiment of the present invention.

FIG. 2 is a flow chart 200 showing the operation of a base station 102 and a mobile station 110 that use the radio frequency re-entry procedure of the present invention. The mobile station initiates the process by performing 202 an initial network entry process. An initial network entry process is usually performed when a mobile station 110 is initiated on the network for the first time or after the mobile station is powered on. As a part of the mobile station 110 performing the initial entry into the network 100, the base station 102 provides 204 the mobile station with an identification of at least one entity within the network 100. The mobile station 102 can store 206 one or more entity identifications for later use. As discussed in more detail below, the entity can be where the mobile context information corresponding to the mobile device 110 will be stored. The entity can be a base station, and in particular the serving base station 102, the paging controller 108 or both. Other entities (not shown) within the network can also be used.

During initial entry procedures, the mobile station 110 is being first recognized by the network 100 and by a base station 102. The network may have data and information about the mobile station, but the location of the stored information is not necessarily known to the base station. During initial network entry procedures, the mobile station provides 208 the base station 102 with mobile station context information that is used to identify the mobile station 110. Mobile station context information can include information such as mobile station Media Access Controller (MAC) address, MAC version, physical layer capabilities, MAC layer capabilities, etc. The mobile context information is used by the base station 102 and other network entities to identify the mobile station 110 and for standard operations of the network 100. The mobile context information can be stored 210 in the serving base station. Upon receipt of the mobile context information, the base station 102 can send 212 the information to the paging controller 108 where it can also be stored 208. In an embodiment, the mobile context information is stored in both entities.

Thus, if the base station 102 stores the information, the base station provides the mobile station with its own identification. If the paging controller stores the identification, then the paging controller identification is provided or sent to the mobile station 110. As understood below, this identifier will be used by the mobile station 110 as a part of the re-entry process.

According to standard protocols such as CDMA, TDMA, GSM, WiMax, WiFi, etc., the base station 102 and mobile station 110 will send control messages and data traffic on the link established during initial entry procedure. It may occur during these communications that the there is an interruption 214 in the link between base station and the mobile station. The interruption can be caused for many reasons including but not limited to a radio frequency (RF) interruption. In this scenario, the RF connection between the base station 102 and the mobile station 110 is severed or lost so that these two devices can no longer communicate with one another. As a part of the standard protocols, the base station 102 and the mobile station 110 will begin a re-entry procedure 216 during which the mobile station 110 will attempt to re-establish an RF connection with the base station 102.

As a part of the re-entry procedure, the mobile station 110 sends 218 a notification to the base station 102 that it is re-entering the network 100. In an embodiment, the notification can be a message that includes information that the mobile station 110 is re-entering the network 100 because of an RF outage or interruption in the link with the serving base station 102. The message can be a range request message. When the base station 102 receives the notification, the base station understands that the mobile station is performing a re-entry procedure instead of an initial entry procedure and obtains 220 the mobile context information from the stored location, e.g. the serving base station 102 or the paging controller 108.

The stored mobile context information can be obtained by sending a message. With the stored mobile context information, the base station 102 can save time by not having to obtain that information from the mobile station 110 as is normally done during initial network entry. If the base station 102 cannot obtain the stored mobile context information, the base station 102 and mobile station 110 will perform the initial entry procedure.

During the RF outage, the mobile station 110 may have moved within the network. During re-entry, the mobile station 110 will try to re-establish communications with the network through a new base station 104 or 106 instead of the serving base station 102. As the mobile station 110 provides notification to the network that it is performing re-entry for an RF outage together with the entity in which the mobile context information is stored, the base station 104/106 can obtain the mobile context information from the stored entity. This permits the advantages of the present invention to be found regardless of where the mobile station 110 re-enters the network 110.

Figure 3:
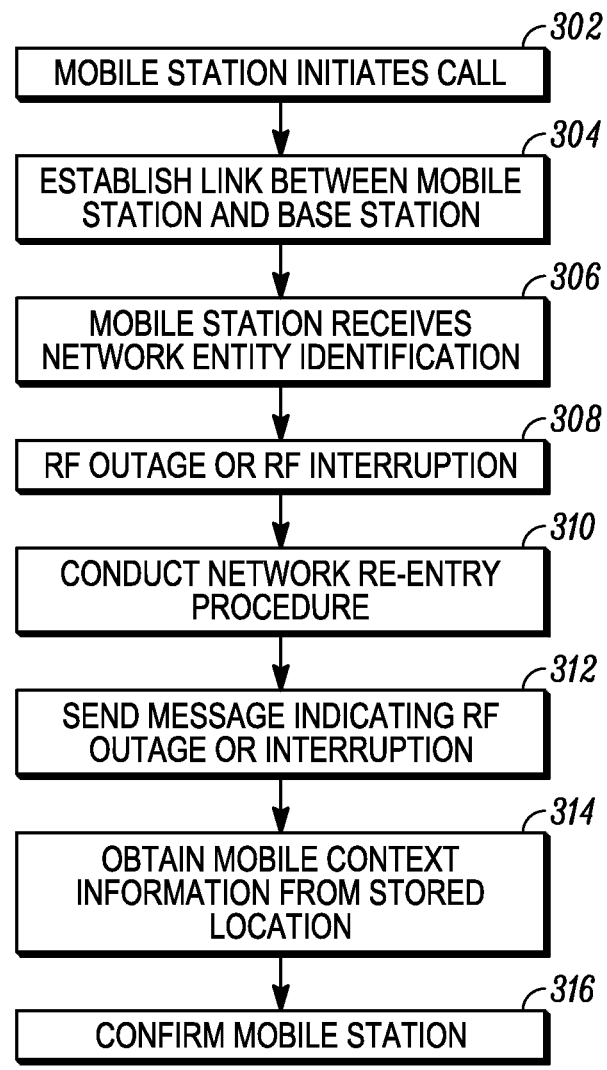
FIG. 3 is a flow chart of the operation of a mobile station utilizing the network re-entry procedures in an embodiment of the present invention.

FIG. 3 illustrates a flow chart 300 showing the operation of a mobile station 110 that is performing a re-entry process after experiencing a RF outage or interruption in the connection with the base station 102. The mobile station initiates 302 a call with the network by establishing 304 a link with the serving base station 102 during an initial network entry procedure according one of the communication protocols. As a part of the initial network entry procedure, the mobile station 110 receives 306 from the serving base station an entity identification for an entity that operates in the network 100. The entity will be the entity at which the mobile context information for the mobile station 110 is stored as described above. The entity can be serving base station 102, the paging controller 108 or another entity within the network that is suitable for such purposes.

During operations, the mobile station 110 may experience an RF outage or interruption 308 that will cause the mobile station 110 to loose the connection with the serving base station 102. Once the RF outage occurs, the mobile station will begin network re-entry procedures 310 during which time it will attempt to re-establish contact with the serving base station 102 or another base station 106, 108 within the network 100. During the network re-entry process, the mobile station 110 will send 312 various messages to the base stations in an attempt to re-establish the link. One of those messages will include an indication that the mobile station 110 experienced an RF outage providing the network with a reason for the re-entry process. The message indicating the RF outage, which can be the range request message, will distinguish the network entry process as a different process from an initial entry process, a handover re-entry network procedure or an idle mode re-entry procedure. In addition, the message can include identification information for the mobile station 110.

With the re-entry process message, the network 110 will obtain 314 the mobile context information from the stored location, e.g. serving base station 102 or paging controller 110, within the network 110. The base station can use the identification received from the mobile station to confirm 316 the mobile context information. With the mobile context information, the base station can perform the re-entry process from the RF outage.

As a part of the re-entry process, the range request message can be used by the mobile station 110 to notify a base station that an RF outage has occurred and that the RF outage re-entry process is being performed. The type value length (TLV) of the range request message may be modified to accommodate the process described. In an embodiment, the TLVs included in the range request message designate status, mobile station address, basic CID, primary management CID, CID update encodings, SA TEK updates compound, HO process optimization, paging controller ID and CMAC.

In view of the foregoing, if the mobile station 110 has previously successfully entered the network using network entry and initialization procedures and the mobile station experiences a loss of synchronization or an RF outage for any other reason while the mobile station is in the active state, the mobile station can perform an RF outage network procedure. This procedure will include scanning for a downlink channel between the mobile station 110 and a base station 102-106 and obtain transmit parameters for the downlink control data and uplink control data messages sent between the entities. The mobile station can perform handover or initial ranging and negotiate basic capabilities with the base station. During this step the mobile station can send a range request message with the ranging location purpose TLV set to a given value designated for RF outage re-entry and the serving base station ID and the paging controller ID. The serving base station ID or paging controller ID indicates where the mobile context information is stored.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A base station comprising:
a radio transmitter;
a radio receiver, and a processor coupled to the radio transmitter and the radio receiver wherein the processor is configured to provide by the radio transmitter multiple entity identifications to a mobile station during initial entry of the mobile station to a wireless communication network, wherein the initial entry comprises establishing a communication link between the mobile station and the base station, store mobile station context information, detect a radio frequency outage with the mobile station, receive from the radio receiver notification that the mobile station is re-entering the wireless communication network in response to the radio frequency outage, wherein the re-entry comprises re-establishing a communication link between the base station and the mobile station, and obtain the mobile station context information to assist the mobile station to re-enter the wireless communication network.

2. The base station of claim 1 wherein apparatus is one of a base station and a paging controller of the wireless communication network.

3. The base station of claim 2 wherein the base station is a serving base station to which the mobile station connects during initial entry.

4. The base station of claim 1 wherein the notification includes a message indicating the mobile station experienced a radio frequency outage.

5. The base station of claim 4 wherein the message is a range request message.

6. The base station of claim 1 wherein the processor is further configured to obtain mobile context information further configured to request mobile context information and receive the mobile context information when it is stored by the entity.

7. The base station of claim 6 wherein the processor is further configured to perform initial re-entry when the entity does not store the mobile context information.

8. The base station of claim 1 wherein the processor is further configured to store mobile station context information further configured to store mobile context information in a serving base station and a paging controller.

9. The base station of claim 1 wherein the processor is further configured to perform initial re-entry when the entity does not store the mobile context information.

10. The base station of claim 1 wherein the processor is further configured to obtain the mobile context information further configured to check whether the mobile context information is stored in one or more entities.

11. A mobile station comprising:
a radio transmitter;
a radio receiver for receiving at least one entity identification for an entity within a wireless communication network during initial entry of the mobile station to the wireless communication network, wherein the initial entry comprises establishing a communication link between the mobile station and a base station;
a processor coupled to the radio transmitter and the radio receiver wherein the processor is configured to detect a radio frequency outage with the wireless communication network and perform a re-entry procedure with the wireless communication network wherein the re-entry procedure includes sending by the radio transmitter a message to the wireless communication network indicating the radio frequency and the at least one entity identification and re-establishing a communication link between the base station and the mobile station.

12. The mobile station of claim 11 wherein the message is a range request message.

13. The mobile station of claim 11 wherein the message includes a mobile station identification.

14. A base station comprising:
a radio transmitter;
a radio receiver, and
a processor coupled to the radio transmitter and the radio receiver wherein the processor is configured to provide by the radio transmitter at least one entity identification to a mobile station, wherein the initial entry comprises establishing a communication link between the mobile station and the base station, store mobile station context information at an entity corresponding to the at least one entity identification, detect a radio frequency outage with the mobile station, receive notification that the mobile station is re-entering the wireless communication network after the mobile station experiences a radio frequency outage with the wireless communication network in response to the radio frequency outage, wherein the re-entry comprises re-establishing a communication link between the base station and the mobile station, and obtain the mobile station context information to assist the mobile station to re-enter the wireless communication network.

15. The base station of claim 14 wherein the entity includes one of a base station and a paging controller of the wireless communication network.

16. The base station of claim 15 wherein the base station is a serving base station to which the mobile station connects during an initial entry into the wireless communication network.

17. The base station of claim 14 wherein the notification includes a message indicating the mobile station experienced the radio frequency outage.

18. The base station of claim 17 wherein the message is a range request message.

19. The base station of claim 14 wherein to obtain mobile context information comprises the processor configured to request mobile context information from the entity and the radio receiver receiving the mobile context information from the entity when it is stored by the entity.

* * * * *